Patented July 10, 1951

2,560,219

UNITED STATES PATENT OFFICE 2,560,219

PROCESS FOR THE PREPARATION OF 1-HALO-3-TRIHALOPROPYL ETHERS

Samuel A. Glickman, Easton, Pa., assignor to General Aniline & Film Corporation, New York, N. Y., a corporation of Delaware No Drawing. Application November 23, 1948, Serial No. 61,728

9 Claims. (Cl. 260—614)

This invention relates to an improved method for producing 1-halo-3-trihalopropyl ethers by the reaction of a vinyl ether with a tetrahalomethane in the presence of a small amount of pyridine and of a peroxidic catalyst or ultra-violet light.

The copending application of Copenhaver and Sargent Serial No. 61,736, filed November 23, 1948, discloses the production of 1-halo-3-trihalopropyl ethers by the reaction of a vinyl ether with a tetrahalomethane during which both the 1:1 adduct and higher molecular weight products were formed. During the study of this reaction, it was discovered that when vinyl ethers containing a minor amount of an acetal were employed in the reaction, the yield of the 1:1 adduct of the vinyl ether and tetrahalomethane was substantially greater than the yield obtained when a vinyl ether free of acetals was employed. I have now discovered that the presence of a small amount of pyridine in the reaction mixture, either in the presence or absence of acetals, directs the reaction to form higher amounts of a simple 1:1 adduct so that this product is obtained in very good yield, substantially quantitative in the case of certain vinyl ethers, and at most only very minor amounts of higher molecular weight products are formed.

The reaction involved in the present application may be formulated as follows:

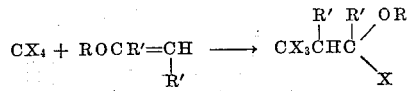

wherein X represents halogen (e. g. chlorine or bromine), R' represents hydrogen or the same or different alkyl or aryl hydrocarbon radicals, and R represents the hydrocarbon residue of an alcohol or phenol, preferably lower alkyl (i. e. methyl, ethyl, propyl, isobutyl, n-butyl). However, so far as operability of the process is concerned, R may also be higher alkyl (i. e. lauryl, stearyl, etc.), aryl (i. e. phenyl, naphthyl, cresyl, etc.) or alkaryl (i. e. benzyl).

The reaction proceeds readily on heating, in the presence of pyridine and a peroxidic catalyst or ultra-violet light, a mixture of a tetrahalomethane and a vinyl ether, the reflux temperature of the mixture and atmospheric pressure having been found to be suitable with vinyl ethers boiling above about 35° C. However, with lower boiling ethers, such as methyl vinyl ether, pressure is necessary.

As examples of vinyl ethers which may be employed in the present invention to produce the corresponding ethers of 1-chloro-3-trichloropropanol may be mentioned the lower alkyl vinyl ethers in which the alkyl group contains from 1 to 5 carbon atoms (i. e. methyl vinyl ether, ethyl vinyl ether, propyl vinyl ether, isopropyl vinyl ether, n-butyl vinyl ether, isobutyl vinyl ether, tertiary butyl vinyl ether, isoamyl vinyl ether, etc.). However, the process is operative with the higher alkyl or cycloalkyl vinyl ethers, such as cyclohexyl vinyl ether, lauryl vinyl ether, stearyl vinyl ether, etc. and if desired, such vinyl ethers as benzyl vinyl ether, phenyl vinyl ether, cresyl vinyl ether, etc. may be employed. In addition to vinyl ethers, related alkyl or aryl $\alpha,\beta$-ethylenically unsaturated ethers of the type indicated in the above equation may be employed to produce correspondingly substituted 1,3,3,3-tetrahalopropyl ethers. As examples of such ethers may be mentioned methyl propenyl ether, methyl isopropenyl ether, methyl butenyl ether, methyl-$\alpha$-phenyl ether, methyl-$\beta$-phenyl vinyl ether and the correponding ethyl, propyl, butyl, amyl and phenyl ethers and the like.

As stated, the preferred catalyst employed for the reaction is an organic peroxide and it is believed that any organic peroxide which is soluble in the halomethane employed is operative in the present process. As examples of usual and preferred peroxidic catalysts for the present invention may be mentioned benzoyl, peroxide, lauroyl, peroxide, and the like. Relatively small amounts of catalyst are effective, the amount employed generally being within the range of from 0.001 to 0.01% by weight of the vinyl ether. However, amounts up to 0.1% or higher (say 1%) may be employed, if desired. Ultra-violet light also catalyzes this reaction and if desired may be employed as the sole catalyst or along with peroxide catalysts.

As examples of tetrahalomethanes which may be employed in the reaction can be mentioned carbon tetrachloride, carbon tetrabromide, trichlorobromomethane, dichlorodibromomethane or tribromochloromethane. In the event that mixed tetrahalomethanes are employed in the reaction, the product obtained will presumably be a 1-bromo-3,3,3,-trihalo compound, although the possibility that an isomeric 3-bromo-1,3,3-trihalo compound may be formed is not precluded.

The present invention can readily be described in detail by considering several specific examples thereof.

*Example I*

462 grams (3 mols) of redistilled carbon tetrachloride containing 0.2 gram of pyridine was heated to the reflux temperature (77° C.). There was then added at a constant rate, with continued heating and stirring, at the reflux temperature, during the course of two hours, a mixture of 100 grams (1 mol) of n-butyl vinyl ether (freshly distilled and of high purity), containing 0.3 gram of benzoyl peroxide and 0.2 gram pyridine. The temperature of the refluxing reaction mixture gradually increased from 77° to 93° C. during the course of the addition and one additional hour of heating. The excess carbon tetrachloride was then distilled off and the concentrate was distilled at reduced pressure to give 250 grams (98% of theory) of 1,3,3,3-tetrachloropropyl butyl ether, boiling point 63 to 68° C. at 0.7 to 1.2 mm.; $n_D^{25}$ 1.4680. The flash residue amounted to 2 grams.

The yield obtained in the above example compared with a yield of about 20% of theory when employing freshly distilled pure n-butyl vinyl ether; yields of about 85% of theory when employing n-butyl vinyl ether which had been stored for several months and contained from 1 to 2% of dibutyl acetal and minor amounts of butanol and acetaldehyde; and yields of 81 to 86% of theory when employing freshly distilled n-butyl vinyl ether to which had been added from 1 to 2% of dibutyl acetal, all under substantially similar conditions.

*Example II*

462 grams (3 moles) of redistilled carbon tetrachloride, containing 0.3 gram of pyridine, was heated to 75° C. There was then added with continued stirring and heating at a rate so that the flask temperature was maintained at 75° C., a solution consisting of 231 grams (1.5 moles) of redistilled carbon tetrachloride, 108 grams (1.5 moles) of freshly distilled ethyl vinyl ether of high purity and 0.5 gram benzoyl peroxide and 0.2 gram of pyridine. The addition required seven hours and the mixture was then heated at reflux for an additional three hours, during which time the temperature gradually increased to 90° C. The excess carbon tetrachloride was removed by distillation and the concentrate was distilled at reduced pressure to give 310 grams (91.5% of theory) of 1,3,3,3-tetrachloropropyl ethyl ether, boiling point 79 to 80° C. at 11 mm., $n_D^{25}$ 1.4695. The flask residue weighed 3 grams.

*Example III*

231 grams (1.5 moles) of redistilled carbon tetrachloride containing 0.2 gram pyridine was heated to the reflux temperature (77° C.) in a transparent quartz flask and subjected to irradiation from an ultra-violet light source (Mazda A–H–5; distance of flask from light about 10 cm.). There was added at a constant rate with continued ultra-violet irradiation, heating and stirring, at the reflux temperature in the course of three hours, a mixture consisting of 50 grams (0.5 mol) of n-butyl vinyl ether (freshly distilled) and 0.2 gram of pyridine. Following eight additional hours of ultra-violet irradiation and heating, during which the temperature rose to 86° C., the excess carbon tetrachloride was removed by distillation and the concentrate was distilled at reduced pressure to give 90 grams (71% of theory) of 1,3,3,3-tetrachloropropyl butyl ether, boiling point 68 to 70° C. at 0.9 to 1.0 mm. The flask residue amounted to 3.5 grams.

It will be noted that in the foregoing examples a substantial excess (200%) of carbon tetrachloride was employed, and it has been found that some excess of the tetrahalomethane employed is desirable in order to obtain the best yield of the 1-halo-3,3,3-trihalo ethers. However, good yields of desired ether, although somewhat lower than those obtained where a substantial excess of tetrahalomethane is employed, can be obtained by the process of the present invention when employing substantially equal molar proportions of tetrahalomethane and vinyl ether, as illustrated by the following example.

*Example IV*

A mixture of 250 ml. of cyclohexane (redistilled tech.), 170 grams (1.1 moles) carbon tetrachloride (washed and redistilled tech.) and from 0.1 to 0.2 gram of pyridine was heated to the reflux temperature (79° C.). There was then added at a constant rate and with continued refluxing and stirring, in the course of two hours, a mixture consisting of 100 grams (1.0 mol) of n-butyl vinyl ether (purified and redistilled), 0.3 gram benzoyl peroxide, and from 0.1 to 0.2 gram of pyridine. During the addition and continued reflux for an additional three hours, the temperature gradually increased to 91° C. The solvent was removed by distillation at reduced pressure and the concentrate again distilled at reduced pressure to give 198 grams (78% of theory) of butyl 1,3,3,3-tetrachloropropyl ether, boiling point 55 to 58° C. at 0.45 to 0.50 mm.; $n_D^{25}$ 1.4678 to 1.4690. The flask residue amounted to 11 grams and represents higher molecular weight adducts.

As illustrated by the foregoing examples the presence of only minor amounts pyridine are effective for directing the reaction toward the formation of the 1:1 adduct of the tetrahalomethane and the vinyl ether. As a usual practice an amount of pyridine equal to from 0.05 to 0.5% by weight of the vinyl ether will be employed although somewhat larger amounts may be used if desired.

I claim:

1. The process of producing 1-halo-3-trihalopropyl ethers which comprises subjecting a mixture of a vinyl ether and at least an equal molar amount of a tetrahalomethane in the presence of a small amount of pyridine to the action of heat of at least about 35° C. and in the presence of free radicals selected from the class consisting of free radicals formed by peroxy compounds acting on the reaction mixture and free radicals formed by ultra-violet light acting on the reaction mixture.

2. The process as defined in claim 1, wherein the free radical specified is that formed by the action of an organic peroxide on the reaction mixture.

3. The process as defined in claim 1, wherein the halo-alkane is carbon tetrachloride.

4. The process as defined in claim 1, wherein the vinyl ether is a lower alkyl vinyl ether.

5. The process as defined in claim 4, wherein the free radical specified is that formed by the action of benzoyl peroxide on the reaction mixture.

6. The process as defined in claim 4, wherein the halo-alkane is carbon tetrachloride.

7. The process as defined in claim 6, wherein the free radical specified is that formed by the action of benzoyl peroxide on the reaction mixture.

8. The process as defined in claim 7, wherein an excess of the halo-alkane is employed.

9. The process of producing 1-halo-3-trihalopropyl ethers which comprises subjecting a mixture of a lower alkyl vinyl ether and an excess of a tetrahalomethane in the presence of a small amount of pyridine to the action of heat at a temperature of at least about 35° C. and in the presence of free radicals selected from the class consisting of free radicals formed by peroxy compounds acting on the reaction mixture and free radicals formed by ultra-violet light acting on the reaction mixture.

SAMUEL A. GLICKMAN.

REFERENCES CITED

The following references are of record in the file of this patent:

UNITED STATES PATENTS

| Number | Name | Date |
|---|---|---|
| 2,065,400 | Salzberg et al. | Dec. 22, 1936 |